July 12, 1955 R. URTEL 2,713,086

METHOD AND CIRCUIT ARRANGEMENT FOR THE SELECTIVE CUTOFF OF THE VERTICAL SYNCHRONIZING PULSES FROM THE RECEIVED TELEVISION SYNCHRONIZING PULSE MIXTURE

Filed Oct. 22, 1952

INVENTOR
RUDOLF URTEL
BY R P Morris
ATTORNEY

United States Patent Office 2,713,086

Patented July 12, 1955

2,713,086

METHOD AND CIRCUIT ARRANGEMENT FOR THE SELECTIVE CUTOFF OF THE VERTICAL SYNCHRONIZING PULSES FROM THE RECEIVED TELEVISION SYNCHRONIZING PULSE MIXTURE

Rudolf Urtel, Pforzheim, Germany, assignor to International Standard Electric Corporation, New York, N. Y., a corporation of Delaware Application October 22, 1952, Serial No. 316,138

Claims priority, application Germany November 15, 1951

2 Claims. (Cl. 178—69.5)

Figures 1, 2, 3:
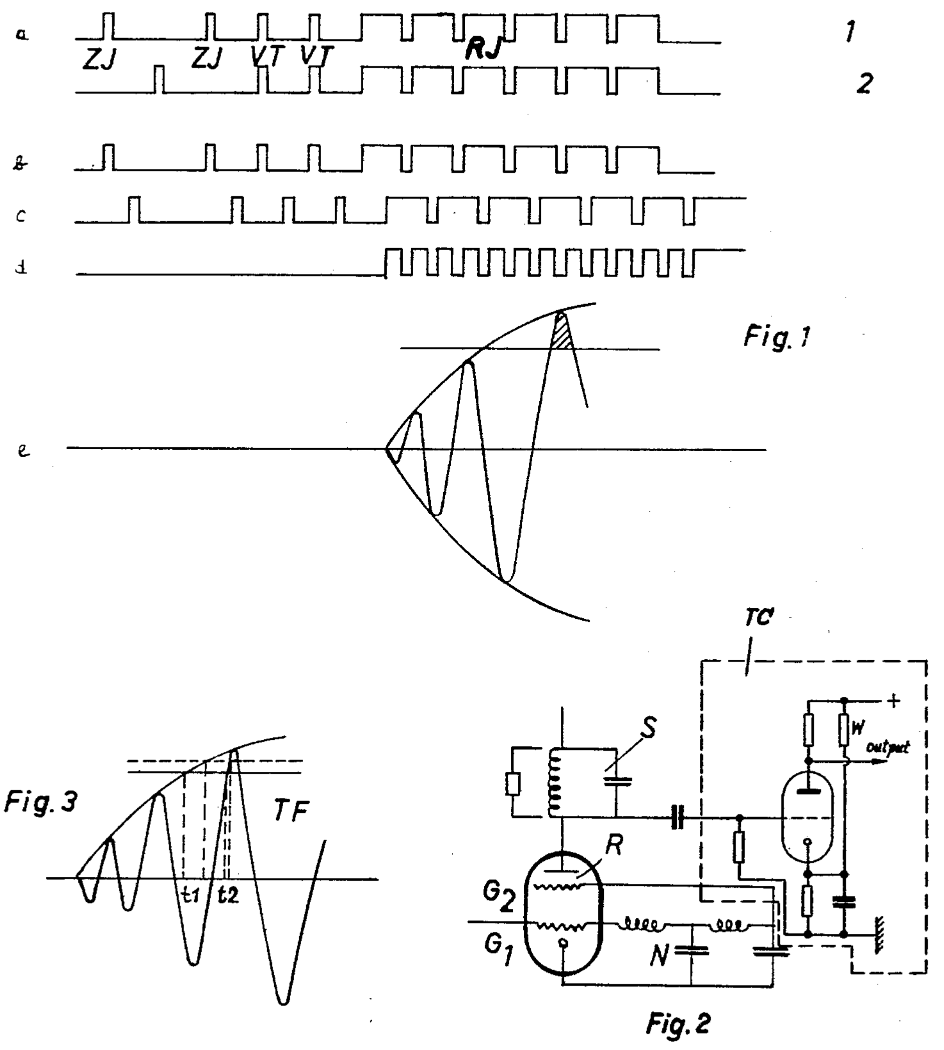

Rectangular impulses of equal amplitude but of a different width are used in television engineering as synchronizing pulses for the horizontal synchronization and the vertical synchronization. The difference between the vertical pulses and the horizontal pulses is to be found merely in their duration, i. e. in a longer period of the vertical pulses. Now the problem is to cut off the vertical pulses from the received pulse mixture.

Since the pulses for the horizontal and vertical synchronization are of different widths it is known practice to carry out a discrimination by means of networks responding to the pulse period. It is possible to employ differentiating networks and integrating networks.

In order to prevent an interruption of the horizontal synchronization during the relatively long vertical change, the wide vertical synchronizing pulses are being cut into, according to the existing CCIR rules or standards, for the purpose of keeping the line generator synchronized through the cuttings, also during the length of the vertical pulse.

If it is intended to integrate vertical synchronizing pulses, provided with cuttings in the aforesaid manner, over their entire period, then a low limiting frequency of the integrating network has to be provided for in order to bridge the momentary cuttings in the vertical pulse. The cutoff of the vertical pulses may then take place by means of the different amplitudes for horizontal and vertical pulses behind the integrating network. The momentary horizontal synchronizing pulses only effect an inconsiderable amplitude, whereas the long lasting vertical pulses cause a large amplitude, exceeding the threshold of response of any other further tube, so that only the vertical pulses are permitted to pass, whilst the horizontal synchronizing pulses are being blocked.

Such an arrangement, however, has the disadvantage that the inset point of the synchronization is poorly defined owing to the flat ascending flank of the amplitude curvature in the output of the integrating network, given by the low limiting frequency.

Now the present invention relates to a method providing the selective cutoff of the vertical synchronizing pulses from the received television synchronizing pulse mixture according to the existing CCIR standards, employing narrow horizontal synchronizing pulses and in which the vertical synchronizing pulses are cut into, for the purpose of maintaining the horizontal synchronizing also during the period of a vertical synchronizing pulse. The inventive method is characterized in that the synchronizing pulse mixture is delayed and that a derived train of pulses with a repetition frequency is composed of the undelayed and delayed train of pulse mixture via a coincidence circuit, corresponding to a multiple of the line frequency, and that this derived train of pulses of a high repetition frequency is integrated in an integrating circuit. According to the further invention a selective circuit will serve as an integrating circuit which is tuned to the high repetition frequency of the derived impulses.

An embodiment of the present invention is represented in the accompanying drawing. The television synchronizing pulse mixture is represented in row *a* (Fig. 1) for the raster 1 and the raster 2, corresponding to the interlaced method. The mixture is composed of the line synchronizing impulses ZI, following each other with a frequency of about 15 kc./s., the pre-statellites VT with an impulse sequence frequency of about 30 kc./s. and, of the vertical synchronizing pulse RI which, as mentioned already above, is cut into in order to keep up the horizontal or line synchronization. The cuttings in the vertical synchronizing pulses likewise have an impulse repetition frequency of about 30 kc./s. This synchronizing pulse mixture corresponds to the demands of the CCIR standards.

According to this invention said synchronizing pulse mixture is applied to the grid G1 of a coincidence tube R and at the same time to a delay network N. The circuit is illustrated in Fig. 2. The outlet of this delay network N is connected to the grid G2 of the tube R. Tube R is biased in such a manner that an anode current will only flow, if both of the grids G1 and G2 are simultaneously supplied with voltage. By means of the network N the train of impulses applied to the grid G2 of the tube, will be delayed by approximately a quarter of a period of the line synchronizing impulse frequency in relation to the train of impulses applied to grid G1. In row *b* of Fig. 1 the train of impulses is represented, which is applied to grid G1 and row *c* shows the train of impulses applied to grid G2. Due to the biasing of the tube, an anode current will only flow if impulses of the two rows *d* and *c* cover each other. The anode current of tube R is illustrated in row *d* (Fig. 1). At the entering of the vertical synchronizing pulses into the coincidence circuit said anode current forms a train of pulses, the repetition frequency of which is double that of the repetition frequency of the cuttings in the vertical impulses. Of course it is also possible to use other types of coincidence circuits than the one described above. The coincidence circuit may consist, for instance also of two tubes, the cathodes of which are connected and are applied to a common resistance, and whereby the undelayed train of impulses is led to the grid of the one tube and the delayed train of impulses is led to the grid of the other tube with a reversed polarity. The deriving train of impulses will then be tapped from the anode circuit of one of the two tubes. The thus created sequence of impulses thereafter is applied to an integrating network comprising, according to this invention, an oscillating circuit S which is tuned to the repetition frequency of the newly generated sequence of impulses. The voltage waveform above the oscillating circuit S is represented in row *e* (Fig.1). At an impingement of the new sequence of impulses, shown in row *d*, the voltage reciprocates over the oscillating circuit S and after a corresponding amplitude selection in a threshold circuit TC, the vertical synchronizing impulse X will be created in the output circuit thereof. The circuit TC comprises e. g. a tube which is biased through the resistance W to the level L in Fig. 1*e*. It will be clear that other forms of threshold clipper circuits can be used.

The advantage of the described method of cutting off, in comparison with methods and circuits known hitherto, is to be seen in the fact that owing to the employed coincidence circuit disturbing impulses, if at all, can only become effective if they, coincidentally, happen to have a spacing of a quarter of a period of the line impulse frequency or if the disturbing impulses amongst each other happen to have a spacing which corresponds to a quarter-period of the line synchronization frequency and that, furthermore, another selection is carried out by the integrating circuit S which is tuned to the frequency of the derived sequence of impulses. This means on the one hand that the inventive circuit arrangement is practically completely deaf to disturbing pulses and, on the other hand, however, also that the timely correct inset of the vertical synchronizing impulse X is well defined by the high-frequent integration.

For reasons of clarity the hitherto known methods are compared in Fig. 3 with the method according to the present invention.

Curve A represents the ascending curvature of the amplitude in the outlet of the integrating circuit. In the known methods, in which the integration is carried out by means of low frequencies, there results a rather undefined timely inset *t1* of the synchronization at an assumed threshold of response RS. In the method according to the present invention, in which the integration is carried out high-frequently, curve A merely represents an envelope and at the same threshold of response the vertical synchronization is carried out in a more well defined manner at the time *t2*.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A synchronizing pulse selecting circuit for providing the selective cutoff of vertical synchronizing pulses from a received television synchronizing impulse train, in which narrow line synchronizing pulses and wide vertical synchronizing pulses are used and in which the vertical synchronizing pulses are cut into in order to keep the line synchronizing during the period of a vertical synchronizing impulse, characterized by a delay circuit for delaying the synchronizing pulse train substantially a quarter of a period of the horizontal synchronizing pulse frequency, a coincidence circuit, means for applying the delayed and undelayed pulse trains to said coincidence circuit to produce a combined train of pulses of substantially an even multiple of said horizontal synchronizing pulse frequency and a resonant integrating circuit tuned to the frequency of said undelayed pulse train for integrating the combined train of pulses to generate the vertical synchronizing pulse.

2. A circuit arrangement according to claim 1, wherein said coincidence circuit comprises a tube having a cathode and anode and two grids, means normally biasing both grids to cut off, means for applying the undelayed pulse train to one of said grids, means for applying the delayed pulse train to the other of said grids whereby said tube is rendered conductive when pulses from both trains are simultaneously present on said two grids, and wherein said integrating circuit comprises a resonant circuit tuned to the repetition frequency of the impulses passing said coincidence circuit and coupled to the anode of said tube and a threshhold clipping means coupled to said oscillating circuit to effect the selection of said vertical synchronizing pulse.

References Cited in the file of this patent

UNITED STATES PATENTS

| | | |
|---|---|---|
| 2,416,424 | Wilson | Feb. 25, 1947 |
| 2,546,972 | Chatterjea | Apr. 3, 1951 |
| 2,566,832 | Grundmann | Sept. 4, 1951 |